US012002377B1

(12) United States Patent
Adnan et al.

(10) Patent No.: US 12,002,377 B1
(45) Date of Patent: Jun. 4, 2024

(54) INSTRUCTIONAL MODEL FOR TEACHING HORIZONTAL CONE SHIFT TECHNIQUE ALSO KNOWN AS SLOB (SAME LINGUAL OPPOSITE BUCCAL) TECHNIQUE

(71) Applicant: KING FAISAL UNIVERSITY, Al-Ahsa (SA)

(72) Inventors: Samira Adnan, Karachi (PK); Rizwan Jouhar, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/443,785

(22) Filed: Feb. 16, 2024

(51) Int. Cl.
G09B 23/28 (2006.01)

(52) U.S. Cl.
CPC .................. G09B 23/286 (2013.01)

(58) Field of Classification Search
CPC .................................................. G09B 23/286
See application file for complete search history.

(56) References Cited

U.S. PATENT DOCUMENTS

| | | | | |
|---|---|---|---|---|
| 2002/0006217 A1* | 1/2002 | Rubbert | ................ | A61C 7/146 |
| | | | | 382/154 |
| 2002/0015934 A1* | 2/2002 | Rubbert | ................ | A61C 7/146 |
| | | | | 433/29 |
| 2003/0235265 A1* | 12/2003 | Clinthorne | ............ | A61B 6/583 |
| | | | | 378/4 |
| 2005/0043837 A1* | 2/2005 | Rubbert | ................ | A61C 7/00 |
| | | | | 700/118 |
| 2013/0209954 A1* | 8/2013 | Prakash | ................ | A61B 1/042 |
| | | | | 433/29 |
| 2023/0316669 A1* | 10/2023 | Marquínez Torrecilla | ................ | |
| | | | | A61B 1/05 |
| | | | | 345/633 |

FOREIGN PATENT DOCUMENTS

| | | |
|---|---|---|
| CA | 3145509 A1 | 2/2021 |
| EP | 3827751 A1 | 6/2021 |
| EP | 3662839 B1 | 7/2023 |
| EP | 3664015 B1 | 7/2023 |

OTHER PUBLICATIONS

Z.A. Che Abd. Aziz "A practical model for endodontic radiography teaching", Annals of Dentistry University of Malaya, vol. 15 No. 2 (2008), pp. 67-70, First available online on Jun. 30, 2018.
Vajrabhaya et al., "A Novel 20° X-ray Angle Shifter for Superimposed Canal Separation", World Journal of Dentistry, vol. 12 Issue 2 (2021), pp. 126-130, First available online on May 20, 2021.

* cited by examiner

*Primary Examiner* — Malina D. Blaise
(74) *Attorney, Agent, or Firm* — Nath, Goldberg & Meyer; Richard C. Litman

(57) ABSTRACT

A horizontal cone shift model includes a baseboard having two mounting openings in parallel orientation to a width of the baseboard. A background board is attached to the baseboard along its length to represent a radiographic film. A plurality of magnetic labels are provided for placement on the baseboard and background board. A first rod and a second rod fit into each of the two mounting openings. The first rod is distinguishable from the second rod. A light source is located on the baseboard and is movable along the length of the baseboard such that shadows of the first rod and second rod appear on the background board. The plurality of labels are used to identify the first and second rods and locations.

14 Claims, 3 Drawing Sheets

INSTRUCTIONAL MODEL FOR TEACHING HORIZONTAL CONE SHIFT TECHNIQUE ALSO KNOWN AS SLOB (SAME LINGUAL OPPOSITE BUCCAL) TECHNIQUE

BACKGROUND

1. Field

The present disclosure relates to systems that assist in teaching dental techniques, and particularly distinguishing overlapping buccal and lingual roots or root canals in radiographs.

2. Description of the Related Art

Distinguishing overlapping buccal and lingual roots/root canals found normally in many teeth is an important radiological concept for undergraduate students of dentistry, dental hygiene, dental therapy and dental assistants. The horizontal cone shift technique, also known as the SLOB (Same Lingual Opposite Buccal) technique allows the dental professional to properly locate overlapping roots/root canals. This is helpful in determining buccolingual position of fractures and perforative defects, to locate foreign bodies and to locate anatomic landmarks in relation to the root apex, such as the mandibular canal.

SUMMARY

An instructional model for teaching horizontal cone shift technique also known as the SLOB (Same Lingual Opposite Buccal) technique assists in teaching undergraduate students of dentistry, dental hygiene, dental therapy and dental assistants in distinguishing overlapping buccal and lingual roots/root canals found normally in many teeth. This is an important radiological concept that has numerous applications in dentistry, particularly for endodontics. The model gives undergraduate students an improved understanding and cognitive recall during practical performance and utility while taking radiographs for dental patients.

A horizontal cone shift model, in one embodiment, includes a baseboard having two mounting openings in parallel orientation to a width of the baseboard. A background board is attached to the baseboard along its length to represent a radiographic film. A plurality of magnetic labels are provided for placement on the baseboard and background board. A first rod and a second rod fit into each of the two mounting openings. The first rod is distinguishable from the second rod. A light source is located on the baseboard and is movable along the length of the baseboard such that shadows of the first rod and second rod appear on the background board. The plurality of labels are used to identify the first and second rods and locations.

The first rod is smooth and the second rod is serrated in some embodiments.

The plurality of magnetic labels include a buccal label, a mesial label, a lingual label and a distal label.

The light source is an LED light source in some cases and can rotate.

The horizontal cone shift model includes a channel that extends along the length of the baseboard. The light source is located in and is movable along the channel.

Each of the two mounting openings is threaded such that the first rod and the second rod can be screwed into place.

A horizontal cone shift model method includes: placing a first rod and a second rod in two mounting openings in a baseboard, the two mounting openings being in parallel orientation to a width of the baseboard and the first rod being distinguishable from the second rod; placing a plurality of magnetic labels on the baseboard and a background board attached to the baseboard along its length to represent a radiographic film, the plurality of labels identifying the first and second rods and locations; illuminating the first rod and the second rod with a light source located on the baseboard, the light source movable along the length of the baseboard such that shadows of the first rod and second rod appear on the background board.

The first rod is smooth and the second rod is serrated.

The plurality of magnetic labels include a buccal label, a mesial label, a lingual label and a distal label.

The light source is an LED light source and can rotate.

The method further includes moving the light source located in a channel that extends along the length of the baseboard.

Each of the two mounting openings is threaded such that the first rod and the second rod can be screwed into place.

These and other features of the present subject matter will become readily apparent upon further review of the following specification.

DETAILED DESCRIPTION OF THE PREFERRED EMBODIMENTS

An instructional model for teaching Horizontal Cone Shift Technique also known as the SLOB (same lingual opposite buccal) technique, aids in distinguishing overlapping buccal and lingual roots or root canals in radiographs. The model and a method of using the model have the following characteristics:

Features of the Instructional Model:
The instructional model has a rectangular metallic baseboard on which there are two threaded inlets in parallel orientation corresponding to a width of the board and a channel for movement of a light source with orientation corresponding to a length of the baseboard.
A rectangular white metallic background board attached to the baseboard along its length to represent a radiographic film.
Four magnetic labels ("Mesial", "Distal", "Buccal", "Lingual") which serve to orient the students regarding the direction in which the light source is moved.
Three metal rods, two smooth and one with external indentations along its length so as to cast a shadow distinguishable from the smooth rod. These rods have threads corresponding to the inlets of the baseboard, so that they can be firmly screwed into place. These rods represent the roots of teeth/root canals which are automatically in the same plane and overlap radiographs.
A battery-operated vertical LED light source with a switch to turn it on/off, and which moves in left and right direction horizontally along a designated channel in the baseboard and is able to rotate 90 degrees horizontally. This corresponds to an X-ray source.

Figure 1:
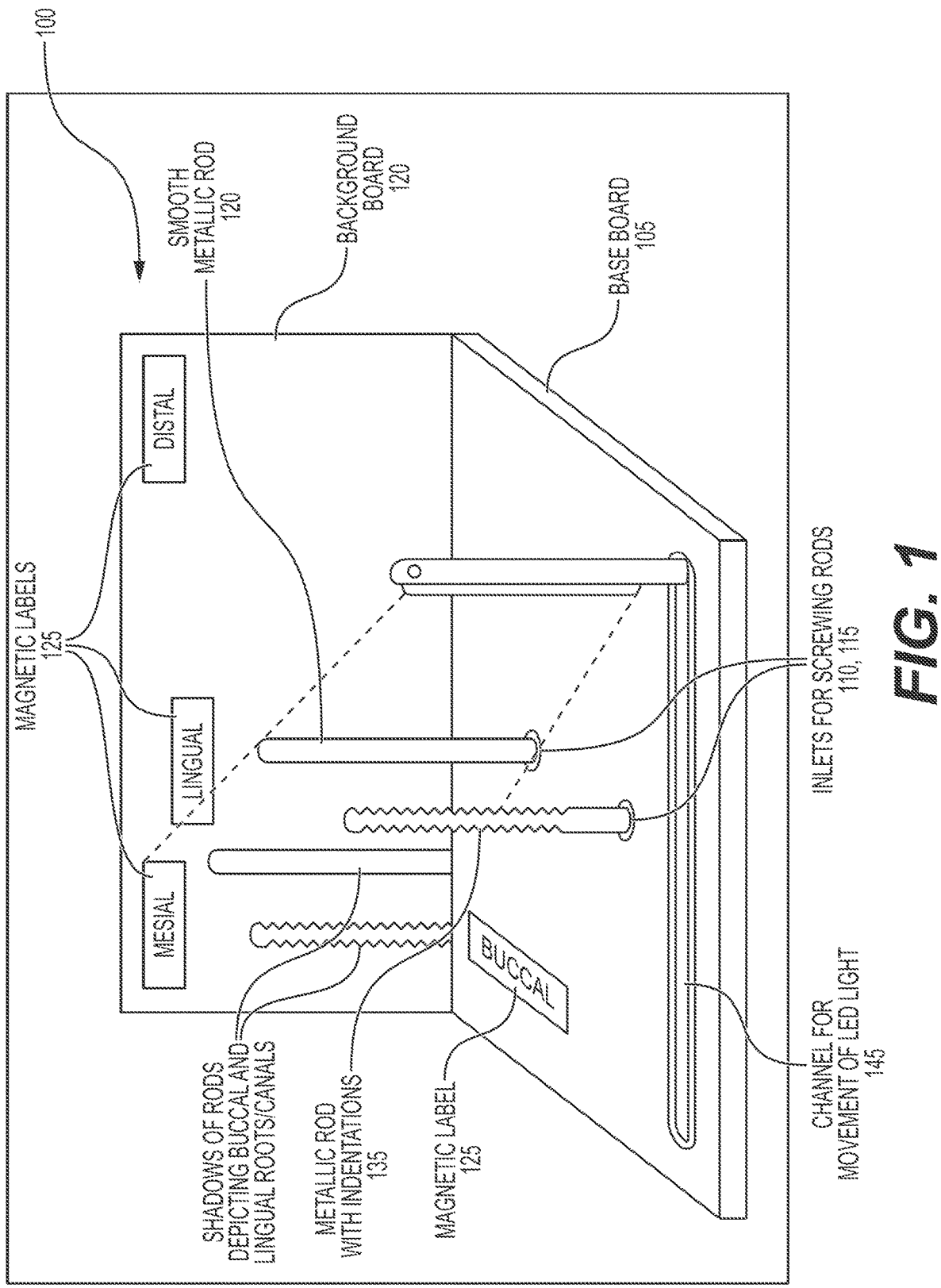
FIG. 1 is an illustration of a horizontal cone shift model.

FIG. 1 is an illustration of a horizontal cone shift model 100. Horizontal cone shift model 100 includes a baseboard 105 having two mounting openings 110,115 in parallel orientation to a width of the baseboard 105. A background board 120 is attached to the baseboard 105 along its length to represent a radiographic film. A plurality of magnetic labels 125 are provided for placement on the baseboard 105 and background board 120. A first rod 130 and a second rod 135 fit into each of the two mounting openings 110,115. The first rod 130 is distinguishable from the second rod 135. The first rod 130 is smooth and the second rod 135 is serrated in some embodiments.

A light source 140 is located in a channel 145 of the baseboard 105 and is movable along the length of the baseboard such that shadows of the first rod 130 and second rod 135 appear on the background board 120. The light source 140 is an LED light source, in this embodiment, and can rotate.

The plurality of magnetic labels 125 are used to identify the first and second rods and locations. The plurality of magnetic labels include a buccal label, a mesial label, a lingual label and a distal label.

Each of the two mounting openings 110,115 is threaded such that the first rod 130 and the second rod 135 can be screwed into place on the baseboard 105.

Figure 2:
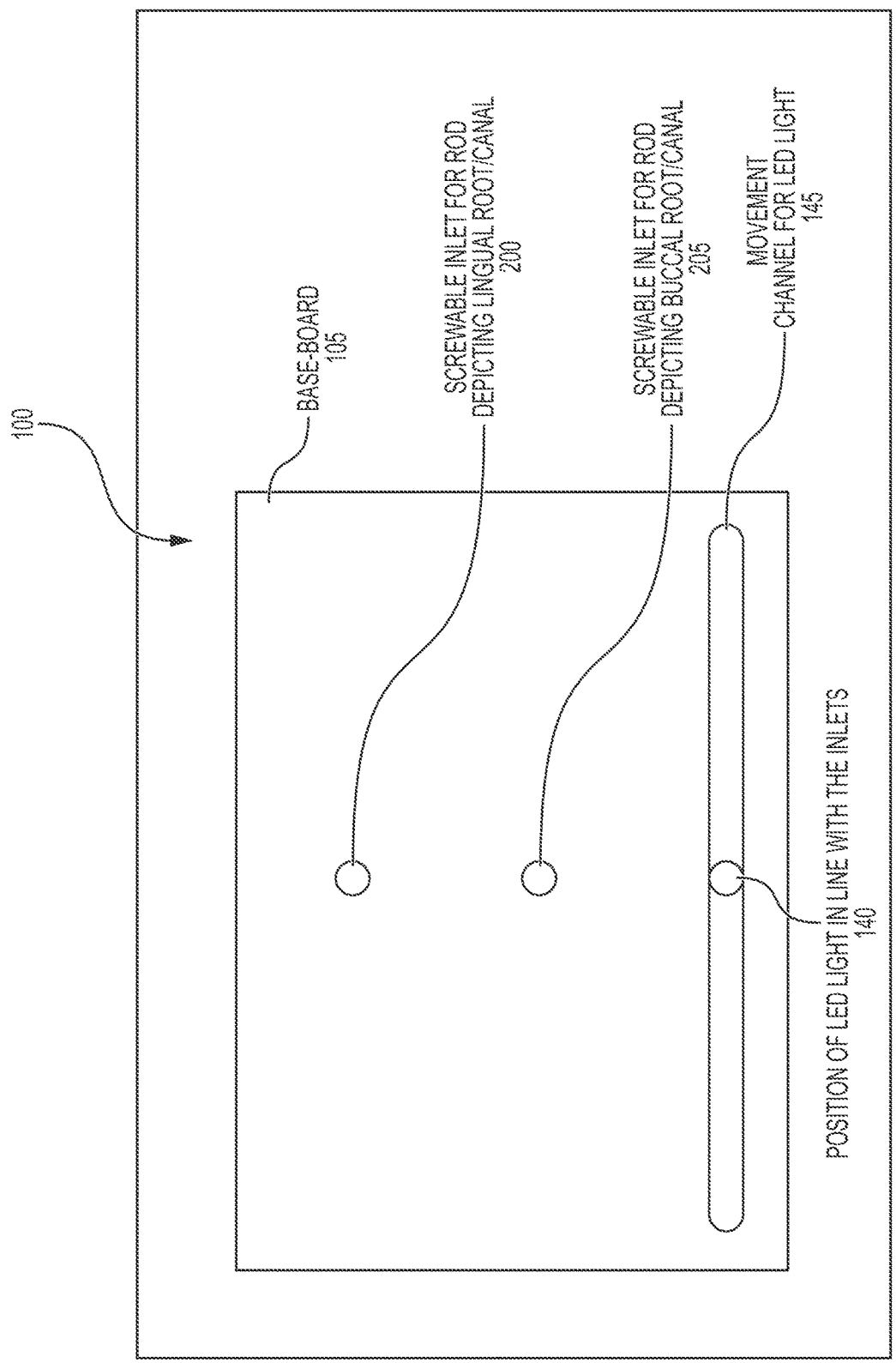
FIG. 2 is a top view of the horizontal cone shift model.

FIG. 2 is a top view of the horizontal cone shift model 100. The baseboard 105 includes a lingual root/canal mounting opening 200 and a buccal root canal mounting opening 205 in parallel orientation to a width of the baseboard 105. A channel 145 runs along the length of baseboard 105 and a light source 140 is guided within the channel 145 down the length of the baseboard 105.

Figure 3:
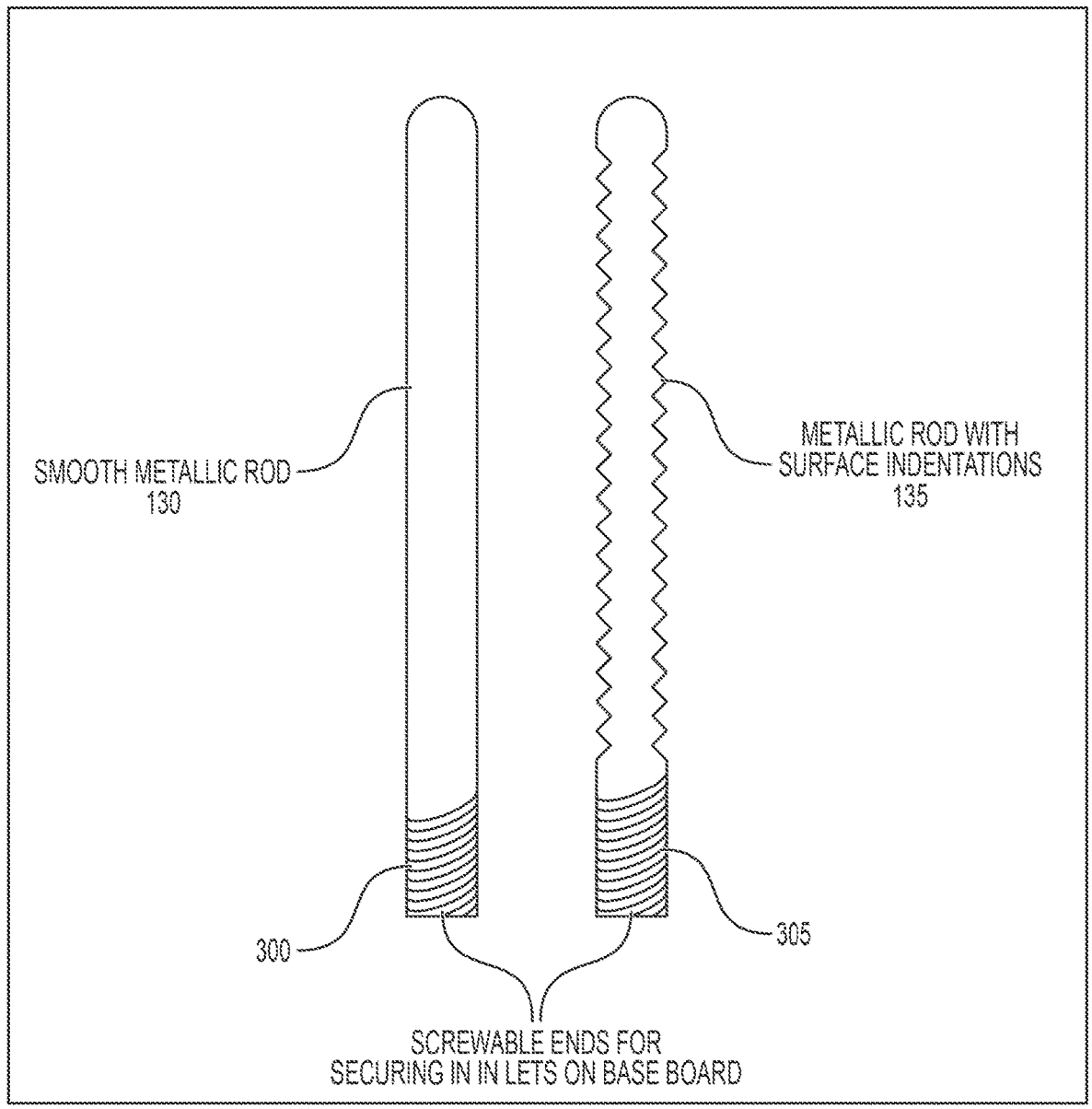
FIG. 3 is an illustration of a first rod and a second rod.
Similar reference characters denote corresponding features consistently throughout the attached drawings.

FIG. 3 is an illustration of the first rod 130 and the second rod 135. The first rod 130 is a smooth metallic rod and includes threads 300 that are screwable into the mounting openings 110,115 and 200,205. The second rod 135 is a metallic rod that includes indentations (serrated) and threads 305 that are screwable into the mounting openings 110,115 and 200,205.

Method of Using the Model:

Step 1: Before demonstration, an instructor places any one magnetic label ("Mesial" or "Distal") on one end of the background board and the remaining one on the other end.

Step 2: The instructor then screws-in a smooth rod on one of the inlets and the rod with the indentations on the other inlet. The rod in the inlet closer to the background board is considered lingual while the other one is considered buccal, since the background board represents an x-ray film which is placed in the lingual sulcus of a patient.

Step 3: The instructor then turns the LED light on, while it is positioned in the same parallel plane corresponding to the orientation of the rods. The shadows of both rods will overlap on the background board, making only one shadow visible. This makes it difficult to distinguish the two rods depicting the buccal root/canal and the lingual root/canal and 1 demonstrates the concept of overlapping of roots/root canals in an actual radiograph.

Step 4: The instructor then proceeds to move the LED light in either the mesial or distal direction, based on the position of the magnetic labels with slight rotation of light towards the rods. The shadows of the two rods now become separated on the background board, making both easily distinguishable. Students now are able to appreciate the visualization of the two separate rods corresponding to the buccal root/canal and the lingual root/canal. This helps demonstrate how changing the horizontal angulation of the x-ray beam can help to distinguish overlapping roots/root canals.

Step 5: Based on the theory of the SLOB rule, the instructor can now ask the students to identify the shadow corresponding to the buccal root/root canal and the shadow corresponding to the lingual root/canal, based on the movement and current position of the shadows on the background board. The students are able to apply the SLOB rule based on the movement of the LED light in reference to the orientation labels.

Step 6: The instructor then confirms the answers from the students, based on the movement of the shadows and the shape of the shadow (smooth vs serrated) by placing the orientation "Buccal" and "Lingual" next to the respective shadows on the background baseboard.

Step 7: This exercise can be repeated with the LED light moved to the other end of the baseboard, interchanging the positions of the "Mesial" and "Distal" labels, interchanging the positions of the smooth and serrated rods in buccal and lingual positions, and with both smooth rods placed in the buccal and lingual inlets instead of one smooth and one serrated. This exercise can be repeated multiple times to create different scenarios to affirm the comprehension of the students of the SLOB technique.

It is to be understood that the present subject matter is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A horizontal cone shift model, comprising:
   a baseboard having two mounting openings in parallel orientation to a width of the baseboard;
   a background board attached to the baseboard along a length to represent a radiographic film;
   a plurality of magnetic labels for placement on the baseboard and background board;
   a first rod and a second rod that fit into each of the two mounting openings, the first rod being distinguishable from the second rod; and
   a light source located on the baseboard, the light source movable along the length of the baseboard such that shadows of the first rod and second rod appear on the background board and the plurality of labels identifying the first and second rods and locations.

2. The horizontal cone shift model as recited in claim 1, wherein the first rod is smooth and the second rod is serrated.

3. The horizontal cone shift model as recited in claim 1, wherein the plurality of magnetic labels include a buccal label, a mesial label, a lingual label and a distal label.

4. The horizontal cone shift model as recited in claim 1, wherein the light source is an LED light source.

5. The horizontal cone shift model as recited in claim 1, wherein the light source can rotate.

6. The horizontal cone shift model as recited in claim 1, further comprising a channel that extends along the length of the baseboard, the light source located in and movable along the channel.

7. The horizontal cone shift model as recited in claim 1, wherein each of the two mounting openings is threaded such that the first rod and the second rod can be screwed into place.

8. A horizontal cone shift model method, comprising:
   placing a first rod and a second rod in two mounting openings in a baseboard, the two mounting openings being in parallel orientation to a width of the baseboard and the first rod being distinguishable from the second rod;

placing a plurality of magnetic labels on the baseboard and a background board attached to the baseboard along its length to represent a radiographic film, the plurality of labels identifying the first and second rods and locations;

illuminating the first rod and the second rod with a light source located on the baseboard, the light source movable along the length of the baseboard such that shadows of the first rod and second rod appear on the background board.

9. The method as recited in claim 8, wherein the first rod is smooth and the second rod is serrated.

10. The method as recited in claim 8, wherein the plurality of magnetic labels include a buccal label, a mesial label, a lingual label and a distal label.

11. The method as recited in claim 8, wherein the light source is an LED light source.

12. The method as recited in claim 8, further comprising rotating the light source.

13. The method as recited in claim 8, further comprising moving the light source located in a channel that extends along the length of the baseboard.

14. The method as recited in claim 8, wherein each of the two mounting openings is threaded such that the first rod and the second rod can be screwed into place.

* * * * *